(12) United States Patent  
Charette et al.

(10) Patent No.: US 7,437,274 B2
(45) Date of Patent: Oct. 14, 2008

(54) METHOD AND APPARATUS FOR OBJECTIVE MEASUREMENT OF NOISE

(75) Inventors: Francois Charette, Canton, MI (US); Vikas Juneja, Utica, MI (US); Suhas Venkatappa, Ypsilanti, MI (US); Rick S. Hooker, Westland, MI (US); Ronald Louis Quaglia, Novi, MI (US); Michael Alan Blommer, Ann Arbor, MI (US); Mark Norman Maskill, Birmingham, MI (US)

(73) Assignee: Ford Motor Company, Dearborn, MI (US)

( * ) Notice: Subject to any disclaimer, the term of this patent is extended or adjusted under 35 U.S.C. 154(b) by 1039 days.

(21) Appl. No.: 10/064,731

(22) Filed: Aug. 12, 2002

(65) Prior Publication Data

US 2003/0154054 A1 Aug. 14, 2003

(51) Int. Cl.
    *G06F 11/30* (2006.01)
(52) U.S. Cl. .................................................. 702/184
(58) Field of Classification Search ............ 702/39, 702/44, 48, 54, 56–58, 66–68, 71, 76, 179, 702/182, 183, 184, 191, 75, 81, 82, 90, 103, 702/111, 185, 188; 73/117.3, 583, 587, 662, 73/609, 647, 669, 645
    See application file for complete search history.

(56) References Cited

U.S. PATENT DOCUMENTS

| | | | | |
|---|---|---|---|---|
| 3,594,506 A | * | 7/1971 | Bauer et al. ................... 73/646 |
| 3,695,098 A | * | 10/1972 | Kirkland, Jr. ............... 73/117.1 |
| 4,257,273 A | * | 3/1981 | Knowd ......................... 73/647 |
| 4,287,771 A | * | 9/1981 | Dugot .......................... 73/647 |
| 4,386,526 A | * | 6/1983 | Roeder ......................... 73/587 |
| 4,410,970 A | * | 10/1983 | Law ........................... 369/53.33 |
| 4,550,604 A | * | 11/1985 | Sugimoto et al. ............. 73/587 |
| 4,644,794 A | * | 2/1987 | Vaicaitis ....................... 73/583 |
| 4,739,513 A | * | 4/1988 | Kunugi et al. ................ 381/103 |
| 5,300,925 A | * | 4/1994 | Depfenhart .................. 340/676 |
| 5,435,185 A | * | 7/1995 | Eagan ........................... 73/587 |
| 5,445,029 A | * | 8/1995 | Falsetti et al. ................. 73/609 |
| 5,551,298 A | * | 9/1996 | Rayment ....................... 73/669 |
| 5,615,270 A | * | 3/1997 | Miller et al. ................... 381/57 |

(Continued)

OTHER PUBLICATIONS

Long et al., NVH Reduction Trends, Automotive Engineering International, Oct. 1999, www.sae.org/automag/nvh_reduction/03.htm.*

(Continued)

*Primary Examiner*—Eliseo Ramos-Feliciano
*Assistant Examiner*—Mohamed Charioui
(74) *Attorney, Agent, or Firm*—Joseph Burgess; Raymond Coppiellie

(57) ABSTRACT

A method of objectively and subjectively monitoring noise and correspondingly level or loudness thereof in a product or assembly. The method includes placing a product on the vibration generator. Activating the vibration generator to move or shake the product to simulate usage conditions. A sound recording instrument measures and records the noise emitted by the product or assembly. Comparing an objective metric computed from the recorded noise with a threshold metric. Evaluating the vehicle to determine the noise source when the objective metric exceeds the threshold metric. Saving the objective metric along with the information relating to the source of the noise and necessary repairs for further evaluation and statistical analysis.

19 Claims, 7 Drawing Sheets

U.S. PATENT DOCUMENTS

| | | | | |
|---|---|---|---|---|
| 5,680,096 A * | 10/1997 | Grasmann | | 340/426.27 |
| 5,728,938 A * | 3/1998 | Choi et al. | | 73/593 |
| 5,809,152 A * | 9/1998 | Nakamura et al. | | 381/71.8 |
| 5,934,256 A * | 8/1999 | Wenzlawski et al. | | 123/479 |
| 5,963,724 A * | 10/1999 | Mantooth et al. | | 703/14 |
| 5,970,831 A * | 10/1999 | Mattinger et al. | | 83/13 |
| 6,019,310 A * | 2/2000 | Maino et al. | | 244/17.13 |
| 6,101,882 A * | 8/2000 | Tran et al. | | 73/662 |
| 6,175,787 B1 * | 1/2001 | Breed | | 701/29 |
| 6,182,018 B1 * | 1/2001 | Tran et al. | | 702/66 |
| 6,230,123 B1 * | 5/2001 | Mekuria et al. | | 704/226 |
| 6,257,063 B1 * | 7/2001 | Uhlig | | 73/579 |
| 6,295,510 B1 * | 9/2001 | Discenzo | | 702/183 |
| 6,355,986 B1 * | 3/2002 | Kato et al. | | 290/40 C |
| 6,481,271 B1 * | 11/2002 | Ward et al. | | 73/117.3 |
| 6,493,615 B1 * | 12/2002 | Johnston | | 701/29 |
| 6,507,790 B1 * | 1/2003 | Radomski | | 702/39 |
| 2002/0107625 A1 * | 8/2002 | Beck et al. | | 701/50 |
| 2003/0016124 A1 * | 1/2003 | Schmidt et al. | | 340/425.5 |
| 2004/0015251 A1 * | 1/2004 | Hamada et al. | | 700/94 |

OTHER PUBLICATIONS

Long et al., NVH Reduction Trend, Automotive Engineering International, Oct. 1999, www.sae.org/automag/nvh_reduction/03.htm.*

* cited by examiner

METHOD AND APPARATUS FOR OBJECTIVE MEASUREMENT OF NOISE

BACKGROUND OF INVENTION

1. Field of the Invention

The present invention relates generally to a method and apparatus for measuring noise and correspondingly the level or loudness thereof in a product, such as a motor vehicle, during use; and more particularly, to a method for objectively monitoring and measuring the noise level and comparing the noise level to a known reference value.

2. Background of the Invention

As part of ongoing quality concerns, motor vehicle manufacturers monitor and inspect their products during and after the manufacturing process. One method of tracking vehicle quality is the use of warranty coding parameters. These parameters typically include a list of vehicle systems, individual components associated with the systems and a list of descriptors; i.e., standard descriptive words used to describe any problems or remedial action taken with respect to a particular problem. Utilizing a standard set of codes, aids in evaluating vehicle quality in a consistent and uniform manner.

Operation of a motor vehicle may result in vibrations in the vehicle that can cause noise, or more specifically undesired or unwanted sounds. These sounds are often referred to as squeaks and rattles and typically result from a particular vehicle component or combination of components. The amount of noise generated by such squeaks and rattles, particularly the level or loudness thereof generated during vehicle operation, is one quality or parameter that is monitored both during and after manufacture.

Accordingly, in an attempt to reduce the occurrences of such squeaks and rattles and determine the cause thereof, trained inspectors randomly select and subjectively evaluate vehicles for squeak and rattle noise levels. These evaluations typically entail randomly selecting a vehicle from the assembly line. Placing the vehicle on a vibration inducing apparatus, such as a vehicle shaker or "four-poster" and activating the vibration inducing apparatus to induce vibration in the vehicle. While the vehicle is shaken or vibrated an operator or technician, sitting in the vehicle operator compartment, listens to noise level, specifically the loudness of any sound, including any squeaks or rattles, occurring in the vehicle operator compartment. After listening, the operator or technician makes a subjective determination to determine if the vehicle meets acceptable noise, vibration, harshness, squeak, and rattle levels.

Systems that use a microphone in a vehicle to obtain or record and analyze sound levels exist. Such systems typically determine the cause of the sound; i.e., they primarily function as a diagnostic tool used to locate the source of the excess sound. They do not objectively measure the sound level, nor do they analyze the data obtained by the relating the sound level to the cause thereof.

SUMMARY OF INVENTION

The present invention provides a method and apparatus for objectively monitoring the sound level of vibration induced sounds in a product or assembly and comparing it to a threshold level. The method includes the steps of providing a vibration generator to vibrate a product or assembly. Placing a sound recording instrument adjacent or in the product or assembly. Connecting the sound recording instrument to a data acquisition apparatus. Activating the vibration generator to induce vibration in the product or assembly and measuring and recording the sound level, specifically the loudness of the sound, occurring in the product or assembly as a result of the vibration. Obtaining an objective metric value, such as an N10 loudness objective metric, from the sound recording. Comparing the objective metric value to a predetermined threshold objective metric value selected for the product or assembly.

When the objective metric or N10 level exceeds the threshold objective metric value, the operator or technician then diagnoses the product or assembly to the source or cause of the undesired sound level or noise. Once the source or cause of the undesired sound level or noise is located, the operator or technician identifies the component or portion of the assembly causing squeak or rattle and performs an appropriate repair. The product or assembly is retested to confirm that the undesired sound level or noise is no longer present.

In accordance with the present invention, the recorded sound level and correspondingly objective metric value obtained are saved as raw data by the data acquisition apparatus. In addition, the operator or technician enters information into the data acquisition apparatus related to the diagnosis and repair. The diagnoses and repair information is entered using the customer concern codes or warranty parameters. Thus, information retrieved from the database relating to the products or assemblies tested is available to prepare charts and graphs relating to the source of the undesired sound level or noise; i.e., squeaks or rattles, along with the repair undertaken to correct and eliminate the undesired sound level or noise. In accordance with a further aspect of the invention, information relating to possible causes of the undesired sound level or noise is transmitted to the assembly or fabrication line and when possible, suggestions are made that may help to reduce the undesired sound or noise level.

DETAILED DESCRIPTION

Figure 1:
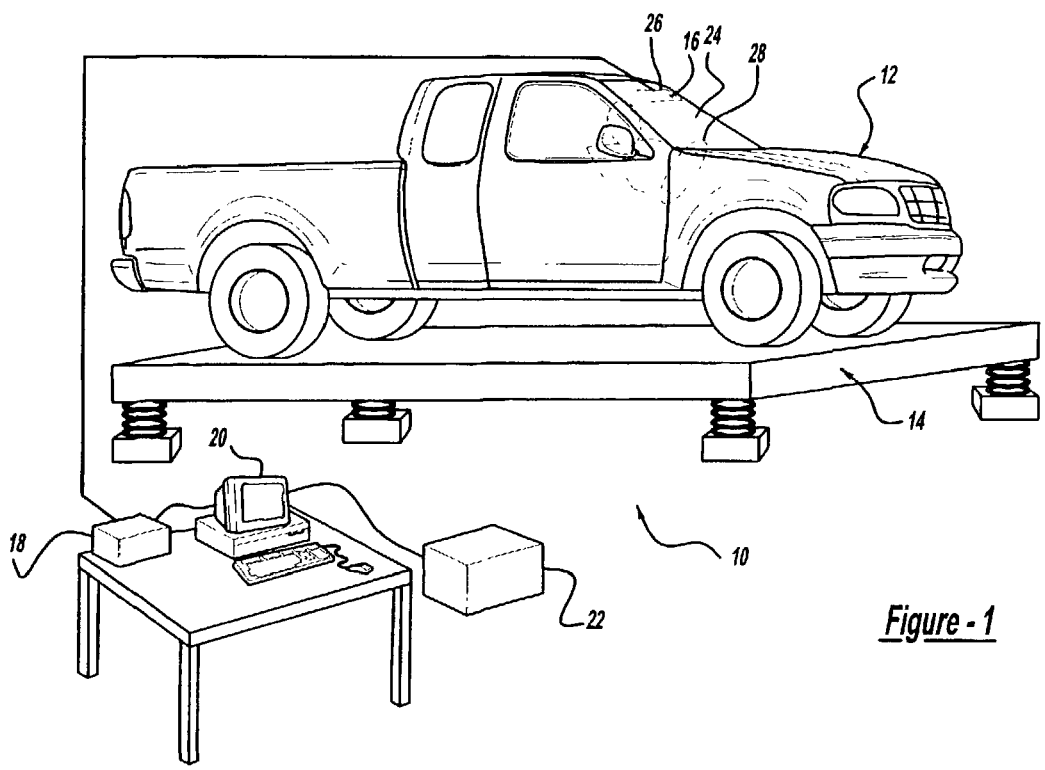
FIG. 1 is a schematic in view of an apparatus for measuring vibration induced vehicle noise or sound according to the present invention shown in use with a vehicle.

FIG. 1 illustrates an apparatus or system 10 for objectively monitoring the level of sound in a vehicle 12 occurring when the vehicle 12 is vibrated to simulate on road operation according to one embodiment of the present invention. While shown for use with a vehicle 12, it should be understood that the method disclosed herein is suitable for use with any product or assembly, including any vehicle components or other products, having quality concerns relating to noise or sound levels. For instance, the method disclosed herein is useful for objectively measuring the noise; i.e. squeak and rattle of vehicle components separate and independent of the vehicle. Accordingly, evaluation of individual components for undesired sound or noise levels may take place prior to assembly in a vehicle.

As shown in FIG. 1, the vehicle 12 is placed on a vibration generator, seen generally at 14. Upon activation, the vibration generator 14, commonly referred to as a "four-poster," shakes or moves the vehicle 12 in a manner that simulates actual driving conditions. Other vibration generation systems that impart energy to a vehicle or product to simulate an in use condition of the vehicle product could also be used. In addition, it should be understood that the following method may also be used during actual operation of a vehicle. For instance, the method may be practiced when the vehicle is driven under normal roadway conditions or on a test track. Thus, as used herein, operation means either actual operation or simulated operation, i.e., when the vehicle is placed upon a vibration generator.

The apparatus 10 includes a sound recording instrument 16 such as a microphone. The sound recording instrument 16 is attached to a signal conditioner 18 that both conditions and amplifies the signal received from the sound recording instrument 16. The signal conditioner 18 is connected to a data acquisition apparatus, such as a computer 20, typically through a microphone socket located on a sound card of the computer 20. The computer 20 disclosed herein may be either a standard desktop or laptop personal computer having a sound card for recording sound data along with suitable memory and processing speed for storing and analyzing the sound data received from the sound recording instrument 16. The computer 20 may also include a network card enabling the computer 20 to connect to a network or mainframe 22.

Figure 2:
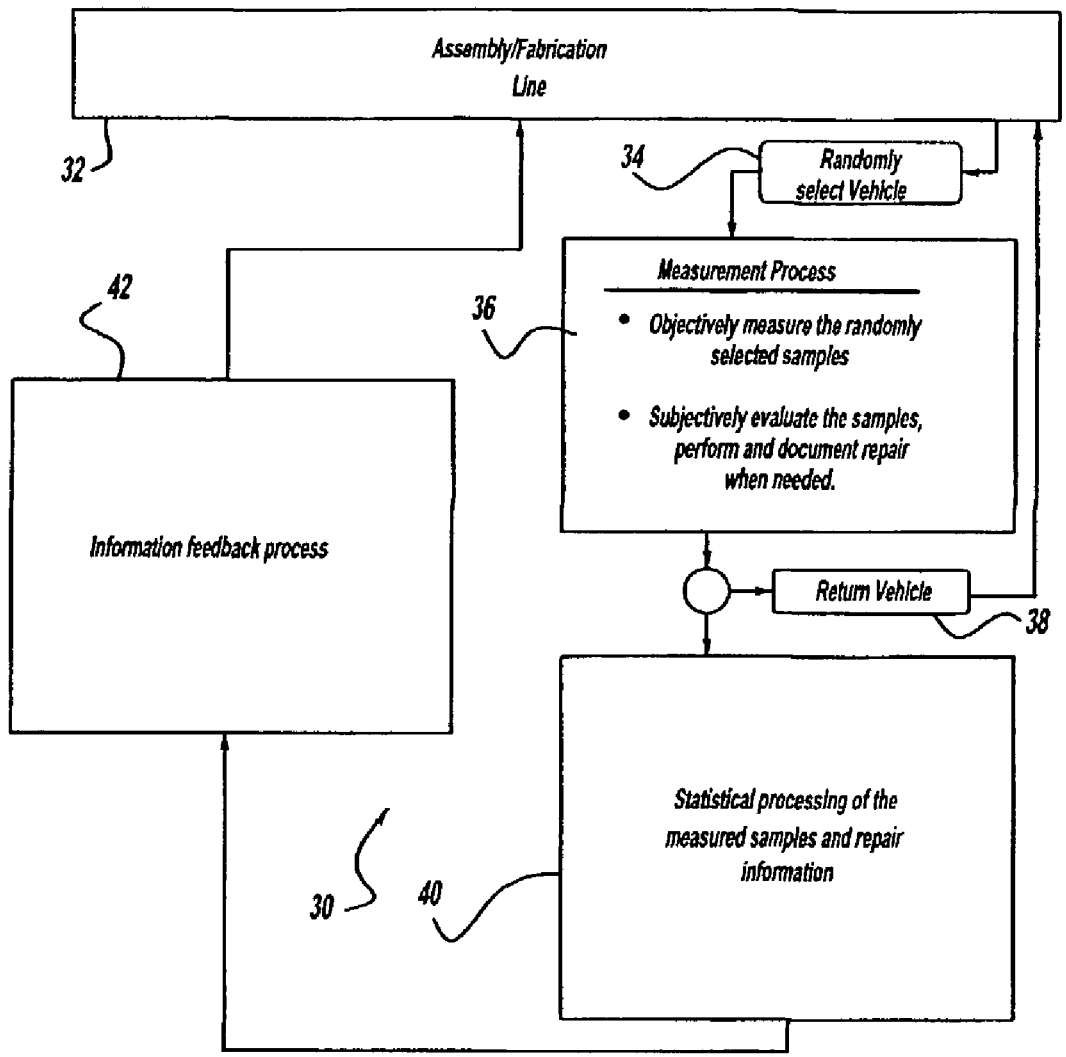
FIG. 2 is a flowchart illustrating the overall method of one embodiment of the present invention.

Referring now to FIG. 2, a block diagram of a method 30 for measuring, statistically processing and generating feedback information based on sound levels according to one embodiment of the present invention is illustrated. In this embodiment of the present invention, the method 30 is used with an assembly/fabrication line 32 for the manufacture of vehicles 12.

In operation, the method 30 begins with block 34, wherein a vehicle 12 is randomly selected from the assembly/fabrication line 32. After positioning the vehicle 12 on the vibration generator 14, an operator or technician places the sound recording instrument 16 in the vehicle operator compartment. Typically, the sound recording instrument 16 is attached to the visor 26 located over the steering wheel 28. Thus, the sound recording instrument 16 is placed such that it records the sound or noise level in the area of the vehicle operator. It may also be placed in other locations or areas of the vehicle if desired to monitor specific vehicle components or potential problem areas. The operator then starts the vibration generator 14 to vibrate the vehicle 12. Block 36 obtains, through the sound recording instrument 16, a measured sound level within the vehicle operator compartment 24. Based on the measured sound level an objective metric is computed. In the present embodiment, the objective metric is based on a N10 loudness scale, which is a common squeak and rattle descriptor. The N10 level is that sound level reached or exceeded by ten percent of the values. Accordingly, and objective metric based on the N10 loudness scale is computed for each tested vehicle. The objective metric or N10 level for the tested vehicle is then compared to a predetermined threshold metric or threshold N10 level.

Figure 6:
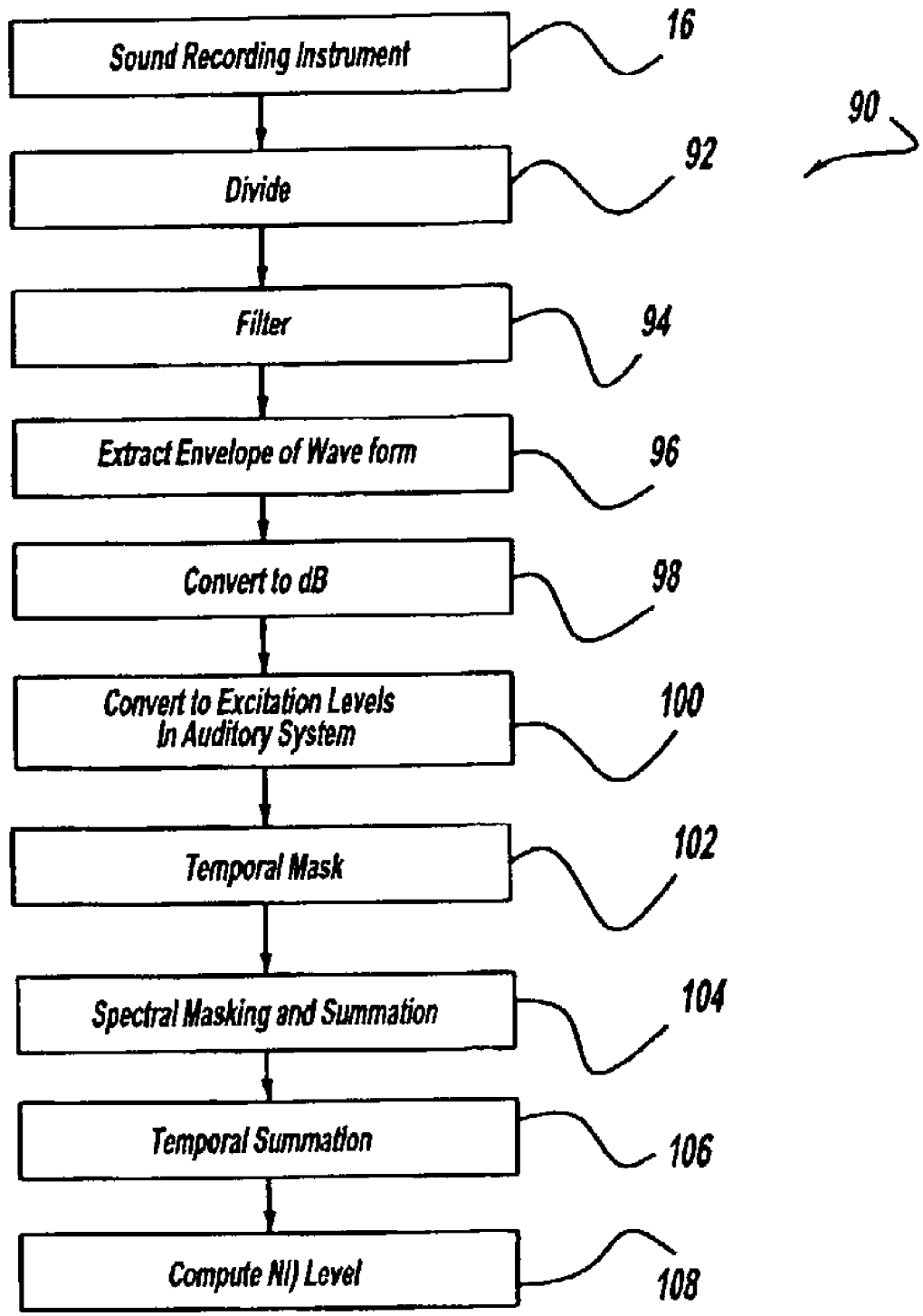
FIG. 6 is a flowchart illustrating a method of computing the objective metric.

FIG. 6 illustrates a flow diagram 90 that represents operation of the method to compute the objective metric based on the measured sound level. In operation, a block 92 divides the signal received from the sound recording instrument 16 into preferably twenty-eight equal signals. The sound recording instrument 16 signal is an electrical signal representing audio sounds of the noise recorded from the vehicle 12. For simplicity, flow diagram 90 illustrates the processing operation of only one of the divided signals. The processing operation is the same for each of the divided signals.

Block 94 then filters the divided signal to extract signals with different frequency content. Block 94 includes a bank of preferably twenty-eight bandpass filters, known as one-third octave filters, each corresponding to a respective divided signal. Each bandpass filter receives its respective divided signal to pass a signal of desired frequency content. Preferably, the bank of bandpass filters have center frequencies from 25 Hz to 12.5 kHz.

Block 96 then extracts the envelope of the waveform of the divided filter signal. Block 98 then converts the extracted envelope to decibel (dB). Block 100 then converts the extracted envelope to an excitation level corresponding to an excitation level used in the human auditory system. The twenty-eight signals are reduced to twenty-one critical band signals according to ISO 532B. Block 102 then temporal masks the excitation levels.

In essence, blocks 96, 98, 100, and 102 model non-linear processing in the human auditory system, resulting in a time-frequency representation of the acoustic activity in the human auditory system.

Block 104 then spectral masks the critical bands; i.e., relates the masking of one critical band by neighboring critical bands. Starting at the specific loudness of the lower band, the loudness in the upper band is decreased at a rate determined by the masking slope. Accordingly, spectral masking alters the specific loudness in each masked band. Block 104 then sums the specific loudness of each critical band together to give the total loudness.

Block 106 then performs a temporal summation, or integration that step models the growth of loudness as a function of time. Finally, block 108 computes the N10 level based on the loudness of the signal received from block 106.

The threshold metric or threshold N10 level must be set for each type or model of vehicle. The threshold N10 level may be determined in several ways. One way is to randomly select a representative sample of vehicles. The sound level in these vehicles is measured and the recorded value is used to establish the threshold metric or threshold N10 value. Another way is to have a trained technician subjectively evaluate and select a vehicle meeting the appropriate noise level standards. The sound level of this vehicle is then recorded and from that, a threshold metric or threshold N10 level is developed.

As set forth more fully below, an objective metric or N10 level corresponding to the sound level recorded by the sound recording instrument 16 is computed for each vehicle 12 tested. When the objective metric or N10 level exceeds that of the threshold metric or threshold N10 level, the operator or technician subjectively evaluates the vehicle to determine the source of the undesired sound or noise. Once the source is located, the operator or technician performs and documents any repairs necessary. Block 38 returns the vehicle to the assembly/fabrication line.

Block 40 takes the data obtained in block 36 and statistically processes the data to place the data in usable form. Charts or graphs illustrating the concerns or problems entered during or after the measurement process by the technician or operator are one method of displaying the collected data. Additional information pertaining to the tested vehicle may also be displayed, including, identification of vehicle subsystems or components causing the noise or squeak and rattle; for example: the exterior, body, hood or trunk, underbody, suspension and brakes, power train, steering, instrument panel and consoles, audio, glass or doors, seats, restraints, or other interior items not previously listed, along with a description of any repairs taken to alleviate any noise or squeak and rattle concerns.

Block 42 then generates and provides feedback to the assembly/fabrication line 32 based on the statistically processed data including any information related to the cause of the undesired sound level or noise, such as where squeaks and rattles emitted by the vehicle are occurring. The feedback may also include possible suggestions relating to manufacturing/design changes that may reduce squeak and rattle concerns.

Accordingly, the overall method the present invention is comprised of three independent parts: first, measuring the noise or sound, specifically the loudness thereof, emitted when vibrating the vehicle along with making any repairs, with associated documentation, necessary to eliminate the noise; second, statistically processing the obtained information and generating reports, including preparing charts or graphs enabling the data to be analyzed; and third, providing feedback reports relating to cause and repairs to the assembly/fabrication line.

Figure 3A:
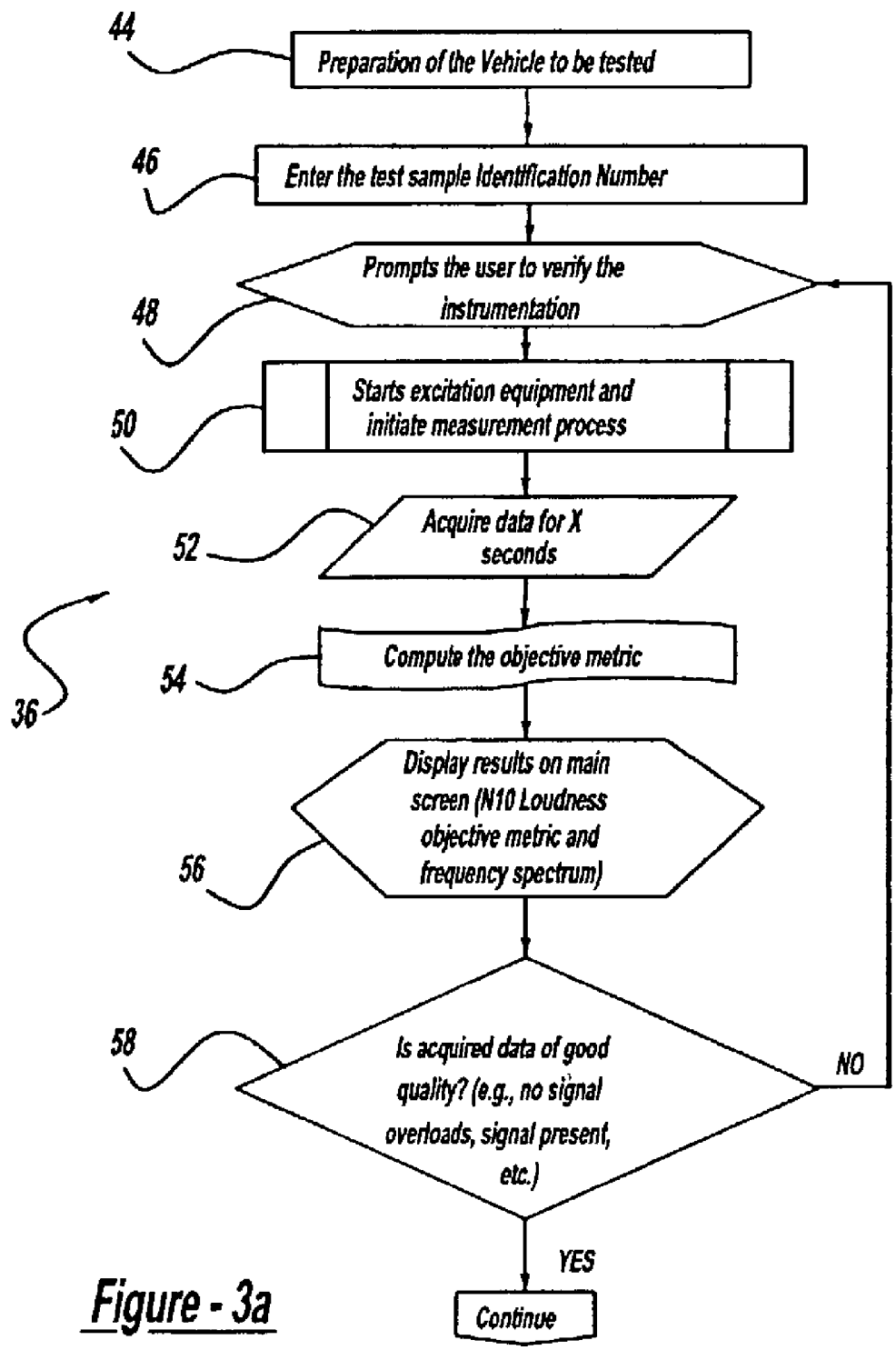
FIGS. 3a and 3b are flowcharts illustrating a method of measuring, comparing and storing the sound or noise level generated during vehicle vibration according to the overall method illustrated in FIG. 2.
Figure 3B:
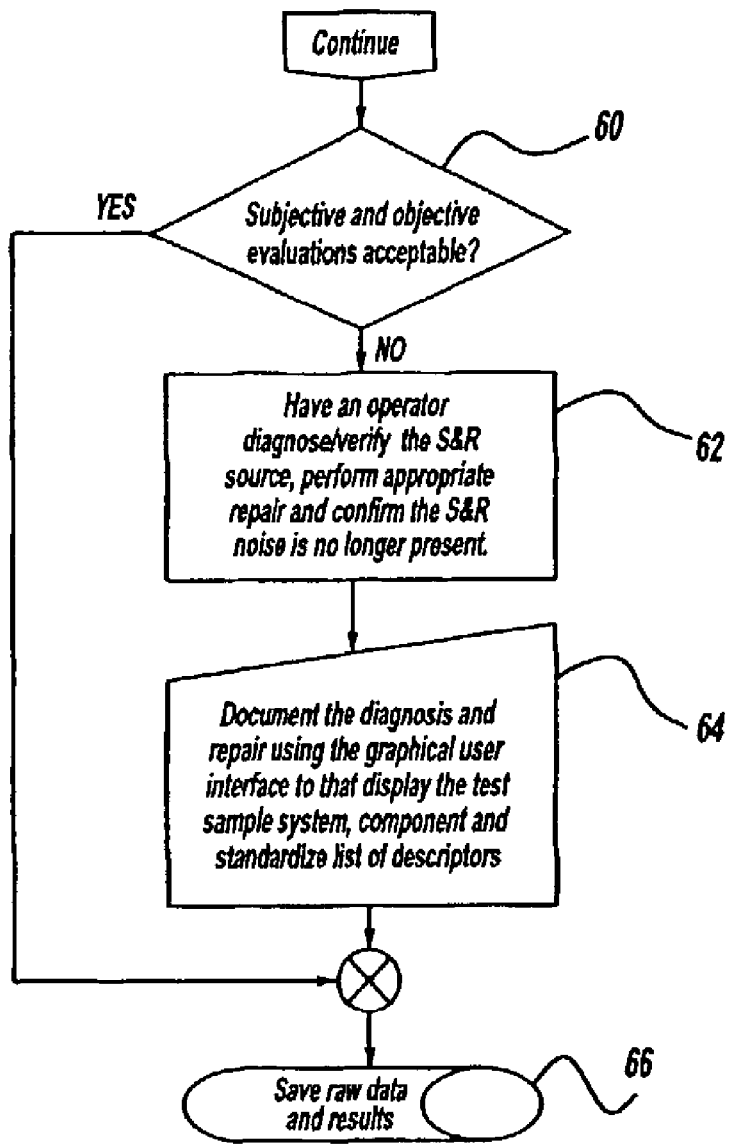

Turning now to FIGS. 3a and 3b, block 36 is shown in detail and begins with block 44, which provides for preparation of the vehicle 12 to be tested. The steps relating to preparation include, as set forth earlier, setting up the vehicle 12 on the vibration generator 14 or excitation fixture and removing all items on the vehicle 12 that might create random or additional noise. This includes removing any loose items in the vehicle 12 along with the plastic covers on the seats of the vehicle 12, emptying the context of the glove box, placing all the seats upright and locked in their tracks, closing the doors, hood and trunk, and ensuring that all windows are fully closed. Once initial preparations are complete, the sound recording instrument 16 or microphone is installed in the vehicle 12 and connected to the signal conditioner 18.

As shown in block 46, the operator or technician then enters the vehicle identification number into the computer 20 of using a keyboard or an appropriate graphical user interface located on the computer 20. Other information relating to the vehicle made may also be entered at this time. Block 48 sets forth the next step in the process wherein the computer 20, through an appropriate graphical user interface, prompts the operator or technician to verify the instrumentation. After verification, block 50 starts the vibration generator and initiates the measuring process. After which block 52 acquires data for a set period, the period being a suitable time for the sound recording instrument 16 to obtain the requisite sound sample. In the present embodiment, the time is fifteen seconds. Shorter or longer intervals could also be used. Block 54 then computes the objective metric or N10 level and block 56 displays on the graphical user interface the N10 loudness objective metric for the tested vehicle.

Block 58 then determines if the acquired data is of sufficient quality. For example, a signal was present and no signal overloads were found. Block 60 then evaluates the sound level by comparing the objective metric or N10 level for the test vehicle with the threshold metric or threshold N10 level. If the value of the objective metric or N10 level is below the value of the threshold metric or threshold N10 level, the process skips to block 66 where the raw data and results are saved. If the value of the objective metric or N10 level is above the threshold metric or threshold N10 level, the process continues to block 62 where the operator or technician diagnoses and/or verifies the source of the noise; i.e., the particular squeak or rattle, and performs an appropriate repair. Once any repairs are finished, the operator or technician confirms that the noise is no longer present.

Block 64 then has the operator or technician document the diagnoses and any necessary repairs using the graphical user interface. Specifically, the operator or technician inputs, through the graphical user interface, into the computer standardized comments and descriptors relating to the system, components, and the necessary repairs. The standardized comments and descriptors correspond to known warranty code parameters enabling a comparison of test data and warranty data. Once data entry is complete, block 66 saves the raw data and results. Block 68 completes the measurement process of block 36 by removing the test vehicle from the vibration generator, putting the test vehicle in its original packaging condition and returning it to the assembly/fabrication line 32.

Figure 4:
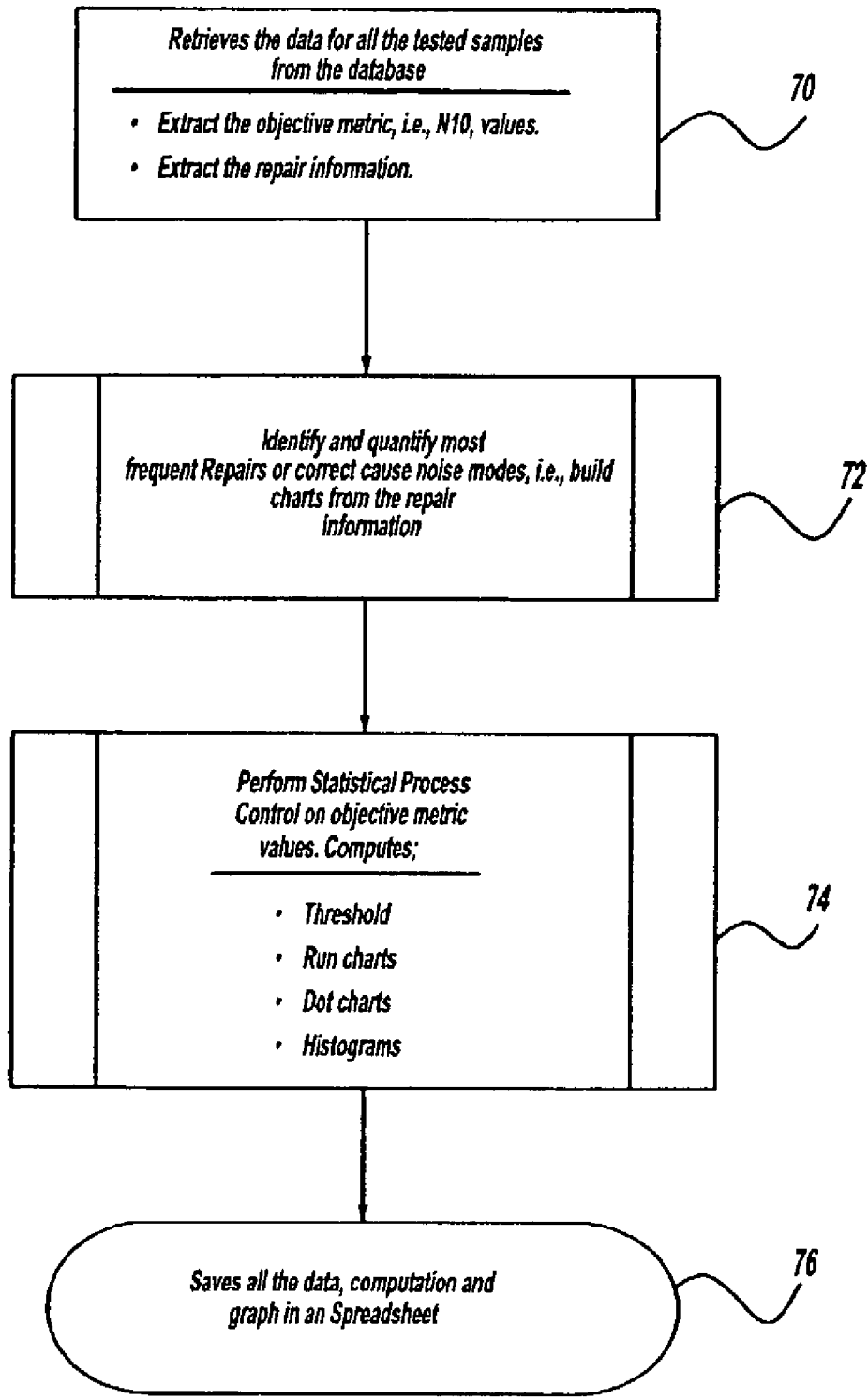
FIG. 4. is a flowchart illustrating the method of statistically analyzing the data obtained according to the overall method illustrated in FIG. 2.

Referring now to FIG. 4 block 40 is shown in detail. Block 70 retrieves the data from all the tested products, which are in the instant embodiment vehicles, stored in the database. Data is extracted relating to both the threshold metric or threshold N10 level and the objective metric or N10 level obtained for each of the tested vehicles. In addition, data relating to the cause of the noise or loudness level for those vehicles whose objective metric or N10 level exceeded the threshold metric or threshold N10 level along with the repair information is obtained. Block 74 then performs a statistical analysis process on the data, including preparation of charts, graphs and histograms illustrating: the threshold metric or threshold N10 level; the objective metric or N10 levels for the tested vehicles; the reasons, specifically, an identification of the subsystems and components, that the threshold metric or threshold N10 level was exceeded; and the repairs performed by the technician or operator. Block 76 then saves the information including the data computation and any charts, graphs or histograms in a spreadsheet.

Figure 5:
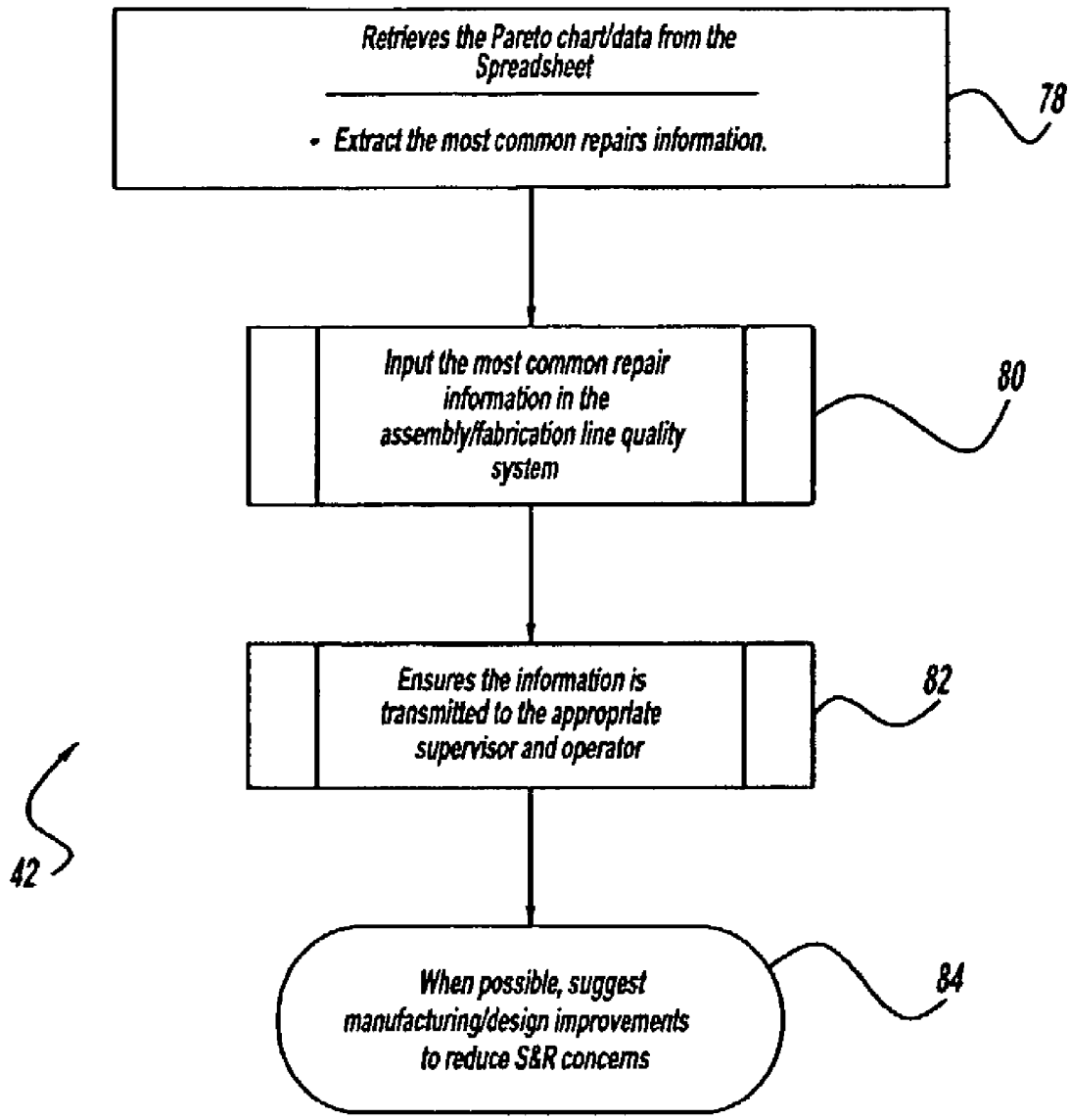
FIG. 5 is a flowchart illustrating the method for providing feedback based on the analyzed data according to the overall method illustrated in FIG. 2.

FIG. 5 shows block 42 in detail, including block 78, which extracts the repair information; i.e., those components needing repair from the spreadsheet. Block 80 inputs this information into the assembly/fabrication line quality system. Block 82 transmits the information to the appropriate supervisor or operator. Finally, block 84 then provides possible suggestions or manufacturing/design improvements to fix or eliminate those problems causing the undesired sound or noise detected during the measuring process.

The invention links the objective measurements with the subjective identification of concerns, i.e., the specific location or source of the undesired sound or noise, using standard customer concern codes (CCC's), to provide a database for prioritizing manufacturing process and product design improvements. This data is also used for tracking quality trends over time, too quickly evaluate and quantify the effectiveness of improvement actions. Using standard Customer Concern Codes enables this data to be directly related to information obtained from existing warranty tracking systems and customer satisfaction surveys. In addition, descriptions of concerns frequently differed between operators, often leading to a failure to specifically identifying significant concerns. Thus, use of standard CCC terminology enables greater accuracy and consistent identification of concerns that correspondingly leads to more effective prioritization of improvement actions.

It will thus be seen that the objects of the invention have been fully and effectively accomplished. It will be realized, however, that the foregoing specific embodiments have been shown and described for the purposes of illustrating the functional and structural principles of the invention and is subject to change without departure from such principles. Therefore, this invention includes all modifications encompassed within the scope of the following claims.

The invention claimed is:

1. A method for objectively monitoring a noise level occurring in a product during use comprising the steps of:
   imparting energy to the product to simulate an in use condition of the product;
   measuring the sound level emitted from the product;
   establishing a threshold metric based on a sound level;
   generating an objective metric based on the measured sound level includes the steps of acquiring sound data for a defined time period, and computing an objective metric based on an N10 loudness scale from the acquired sound data;
   comparing the objective metric with the threshold metric; and
   generating feedback, the feedback including information relating to the comparison of the objective metric and the threshold metric.

2. A method for objectively monitoring a noise level as set forth in claim 1 including the steps of:
   determining when the objective metric exceeds threshold metric;
   when the objective metric exceeds the threshold metric subjectively evaluating the noise emitted from the product to diagnose the reason for the objective metric exceeding the threshold metric; and
   performing any repairs necessary to the product such that the noise level of the product meets acceptable noise level standards.

3. A method for objectively monitoring a noise level as set forth in claim 2 including the step of documenting, using a standardized list of descriptors, the cause of the noise and any necessary repairs to the product.

4. A method for objectively monitoring a noise level as set forth in claim 3 wherein the standardized list corresponds to known warranty code parameters.

5. A method for objectively monitoring a noise level as set forth in claim 2 including the step of preparing at least one report as part of the step of generating feedback, said report providing information relating to repair information.

6. A method for objectively monitoring a noise level as set forth in claim 1 wherein the step of establishing a threshold metric includes the steps of:
   selecting a product that meets allowable noise level standards and measuring the sound level of said selected product; and
   using the measured sound level of the selected product to compute a threshold metric based on an N10 loudness scale.

7. A method for objectively monitoring a noise level as set forth in claim 1 including the steps of:
   saving information related to the objective metric and the threshold metric;
   performing statistical processing based on the saved information; and
   preparing reports based on the saved information.

8. A method for objectively monitoring the noise level as set forth in claim 1 including the steps of:
   documenting any diagnosis and repair relating to the product;
   determining the most common cause of noise in the product; and
   providing possible suggestions to improve the product by reducing overall noise levels.

9. A method for objectively monitoring the sound level of vibration induced sounds on a vehicle comprising the steps of:
   placing a sound recording instrument in a position with respect to the vehicle to record sound emitted from the vehicle;
   connecting the sound recording instrument to a data acquisition apparatus;
   vibrating the vehicle and using the data acquisition apparatus to record the vibration induced sound;
   measuring the level of the vibration induced sound and computing an objective metric; and
   comparing the objective metric with a threshold metric.

10. A method for objectively monitoring the level of vibration induced sound on a vehicle as set forth in claim 9 wherein said step of comparing the objective metric with a threshold metric includes the steps of:
    evaluating the comparison of the objective metric with the threshold metric to determine whether the vibration induced sound level in the vehicle is unacceptable;
    when the evaluation indicates that the sound level is unacceptable, diagnosing the vehicle to determine the source of the unacceptable sound level;
    performing an appropriate repair; and
    confirming that the unacceptable sound level is no longer present.

11. A method for objectively monitoring the level of vibration induced sound on a vehicle as set forth in claim 10 including the step of documenting the diagnosis and repair.

12. A method for objectively monitoring the level of vibration induced sounds on a vehicle as set forth in claim 11 including the step of inputting into the data acquisition apparatus information pertaining to the diagnosis and repair.

13. A method for objectively monitoring the level of vibration induced sound on a vehicle as set forth in claim 10 including the step of using a graphical user interface and standardized list of descriptors to input into the data acquisition apparatus information pertaining to the diagnosis and repair.

14. A method of objectively monitoring the level out of vibration induced sound on a vehicle as set forth in claim 10 including the steps of:
    saving data relating to each vehicle tested including, the objective metric, threshold metric, and any diagnosis and repair; and
    performing a statistical analysis on the saved data.

15. A method for objectively monitoring the level of vibration induced sound on a vehicle as set forth in claim 10 including the steps of:
    saving data relating to each vehicle tested including, the objective metric, threshold metric, and any diagnosis and repair;
    performing statistical processing on the saved data;
    generating feedback based on the statistical processing;
    reviewing the feedback to determine repair information; and
    using said feedback to develop corrective action to reduce the level of vibration induced sound.

16. A method for objectively monitoring the level of vibration induced sound on a vehicle as set forth in claim 9 wherein the objective metric and the threshold metric are based on a N10 loudness scale.

17. A method of objectively monitoring the sound level occurring in a vehicle during operation comprising the steps of:
    placing a sound recording instrument within the vehicle;

connecting sound recording instrument to a data acquisition apparatus;

measuring and recording the sound level emitted from the vehicle during operation;

computing an objective metric based on the recorded sound level;

subjectively evaluating the vehicle to determine the source of the sound emitted from the vehicle when the objective metric exceeds a threshold metric; and if necessary, repairing the vehicle to reduce the sound to an acceptable level.

18. A method of objectively monitoring the sound level occurring in a vehicle during operation as set forth in claim 17 wherein the objective metric and the threshold metric are based on a N10 loudness scale.

19. A method of objectively monitoring the sound level occurring in a vehicle during operation as set forth in claim 17 including the steps of:

documenting the evaluation and repair;

saving data relating to each vehicle tested including, the recorded sound level, the objective metric, threshold metric, the evaluation and any repair;

performing statistical processing on the saved data;

generating feedback information based on the statistical processing; and using said feedback to develop corrective action to reduce the sound level in the vehicle.

\* \* \* \* \*